(12) United States Patent
Chang

(10) Patent No.: US 12,221,076 B2
(45) Date of Patent: Feb. 11, 2025

(54) WIPER CONNECTION STRUCTURE

(71) Applicant: DANYANG UPC AUTO PARTS CO., LTD., Jiangsu (CN)

(72) Inventor: Che-Wei Chang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 18/276,258

(22) PCT Filed: Nov. 8, 2021

(86) PCT No.: PCT/CN2021/129175
§ 371 (c)(1),
(2) Date: Aug. 8, 2023

(87) PCT Pub. No.: WO2022/257349
PCT Pub. Date: Dec. 15, 2022

(65) Prior Publication Data
US 2024/0109517 A1  Apr. 4, 2024

(30) Foreign Application Priority Data
Jun. 11, 2021 (CN) .......................... 202110654422.0

(51) Int. Cl.
*B60S 1/40* (2006.01)

(52) U.S. Cl.
CPC ........... *B60S 1/4087* (2013.01); *B60S 1/4083* (2013.01); *B60S 2001/4058* (2013.01); *B60S 2001/4093* (2013.01)

(58) Field of Classification Search
CPC ........ B60S 1/40; B60S 1/4048; B60S 1/4083; B60S 1/4087; B60S 2001/4035; B60S 2001/4061; B60S 2001/4058
(Continued)

(56) References Cited

U.S. PATENT DOCUMENTS

| 5,920,950 A | 7/1999 | Young, III et al. |
| 2012/0110773 A1 | 5/2012 | Thielen |

(Continued)

FOREIGN PATENT DOCUMENTS

| CN | 201923083 U | 8/2011 |
| CN | 113291253 A | 8/2021 |

(Continued)

OTHER PUBLICATIONS

English language translation of description portion of French publication 2600291, published Jan. 20, 1987 (Year: 1987).*

(Continued)

*Primary Examiner* — Gary K. Graham
(74) *Attorney, Agent, or Firm* — Chun-Ming Shih; HDLS IPR SERVICES

(57) ABSTRACT

A wiper connection structure, comprising a connection body and an upper cover. The connection body is mounted on a wiper blade; an accommodating cavity is formed on the connection body; the accommodating cavity is opened on an upper surface and a side vertical surface of the connection body respectively to correspondingly form an upper opening and an inlet for the head of a wiper to insert into the accommodating cavity; the upper cover is hingedly connected to the upper opening, and the upper cover can sealably close and open the upper opening; in addition, at least one of the accommodating cavity and the upper cover is provided with a limiting member capable of stopping and limiting the head of the wiper, so as to ensure that the head of the wiper does not fall off from the accommodating cavity.

6 Claims, 5 Drawing Sheets

(58) Field of Classification Search
USPC .................................................... 15/250.32
See application file for complete search history.

(56) References Cited

U.S. PATENT DOCUMENTS

| | | |
|---|---|---|
| 2013/0333145 A1 | 12/2013 | Depondt |
| 2021/0009084 A1 | 1/2021 | Pina-Cabello et al. |

FOREIGN PATENT DOCUMENTS

| | | | | |
|---|---|---|---|---|
| DE | 102010062917 A1 | * | 6/2012 | ................ B60S 1/38 |
| DE | 102010062928 A1 | * | 6/2012 | ............ B60S 1/3863 |
| DE | 102012011225 A1 | | 12/2013 | |
| EP | 3228507 A1 | * | 10/2017 | ............ B60S 1/4087 |
| FR | 2600291 A | * | 12/1987 | ................ B60S 1/40 |
| FR | 2600291 A1 | | 12/1987 | |

OTHER PUBLICATIONS

Search Report dated Mar. 3, 2022 of the corresponding PCT patent application No. PCT/CN2021/129175.
Office Action dated May 7, 2024 of the corresponding Japan patent application No. 2023-546102.
Search Report dated Oct. 10, 2024 of the corresponding European patent application No. 21944848.7.

* cited by examiner

WIPER CONNECTION STRUCTURE

CROSS-REFERENCE TO RELATED APPLICATIONS

This application is the National Phase of PCT International Application No. PCT/CN2021/129175 filed on Nov. 8, 2021, which claims priority to CN202110654422.0 filed on Jun. 11, 2021. The entire disclosures of the above applications are all incorporated herein by reference.

BACKGROUND OF THE DISCLOSURE

Technical Field

The technical field relates to a windshield wiper product, and more particularly relates to a wiper connection structure for connecting a wiper and a wiper blade together.

Description of Related Art

Windshield wiper is a regular part equipped on a car, primarily used to wipe away rain, dust, miscellaneous substances, etc. from the windscreen to ensure that the driver has a clear vision.

At present, the common windshield wiper is a frameless wiper, which consists of a wiper and a wiper blade (or wiper strip), and is connected to a car driving device, and the wiper is also detachably connected to the wiper blade. Since the wiper blade is a consumable item, therefore the connection between the wiper and wiper blade must be easily detachable.

However, the common detachable connection between the wiper and wiper blade in the market still has the following drawbacks: (1) the detachable connection structure is not tight enough, which will easily cause the wiper and wiper blade to detach, thus causing safety hazards; (2) the detachable connection structure is not well covered, which will cause the wiper and wiper blade to be exposed and easily damaged by dirt.

In view of the aforementioned drawbacks, this disclosure provides a wiper connection structure to overcome the drawbacks of the prior art.

SUMMARY OF THE DISCLOSURE

Therefore, this disclosure provides a wiper connection structure, which is a new, simple, and reasonable structure with the features of easy assembly and disassembly, high assembly tightness, and good protection, and may greatly improve the installation efficiency of windshield wiper assembly and the safety and service life of use.

The technical measures taken by this disclosure to overcome the above drawbacks is to provide a wiper connection structure for connecting a wiper and a wiper blade together, and the wiper connection structure includes a connection body and an upper cover, the connection body is installed on the wiper blade, the connection body is formed with a containing chamber, the containing chamber is opened at the upper surface and lateral surface of the connection body respectively to form an upper opening and an entrance for inserting a head portion of the wiper into the containing chamber, the upper cover is hinged to the upper opening, and the upper cover is capable of sealing/closing and opening the upper opening; in addition, a limiting part is provided in at least one of the containing chamber and the upper cover for stopping and limiting the head portion of the wiper to ensure that the head portion of the wiper may not fall off from the containing chamber.

In a further improvement of this disclosure, a side of the upper cover and a side of the upper opening are hinged with each other, the upper cover and the upper opening are integrally formed by plastic injection molding, and the other side of the upper cover and the other side of the upper opening are detachably positioned and connected to each other.

In a further improvement of this disclosure, the other side of the upper cover and the other side of the upper opening are snapped with each other.

In a further improvement of this disclosure, based on the upper cover sealing/closing the upper opening, an inner wall on the other side of the upper cover is integrally formed with a hook, and the other side of the upper opening is integrally formed with a snap column that is snapped and connected with the hook.

In a further improvement of this disclosure, the containing chamber and the upper cover are provided with a limiting part capable of stopping and limiting the head portion of the wiper.

In a further improvement of this disclosure, the head portion of the wiper is inserted from the entrance into the containing chamber along the front-rear direction;
the head portion of the wiper is formed with a front step portion and a rear step portion along the front-rear direction and spaced from each other;
the containing chamber is integrally formed with a first limit step on an inner sidewall thereof proximate to the upper cover in a shape matched with the front step portion and capable of stopping and limiting the front step portion, and a second limit step on an inner sidewall thereof proximate to the upper cover in a shape matched with the rear step portion and capable of stopping and limiting the rear step portion;
an inner wall of the upper cover is integrally formed a limit bump capable of stopping and limiting the rear side of the front step portion when the upper cover seals/closes the upper opening.

In a further improvement of this disclosure, the containing chamber is provided with an anti-warping slot on an inner sidewall thereof opposite to the entrance and communicating to the containing chamber, and the front side of the head portion of the wiper is freely inserted in the anti-warping slot.

In a further improvement of this disclosure, the wiper blade is fixed with a round shaft, the connection body is provided with a semicircular snap hole, and the connection body tightly sheathes the round shaft through the semicircular snap hole.

This disclosure has the following beneficial effects: (1) Compared to the related art, the wiper connection structure of this disclosure has the function of easy assembly and disassembly, and high assembly tightness, which greatly improves the installation efficiency and safety of windshield wiper during assembly; (2) The wiper connection structure plays a great role of covering and protecting the junction of the wiper and wiper blade, and effectively prolonging the service life of windshield wiper.

BRIEF DESCRIPTION OF NUMERALS USED IN THE DRAWINGS

Figure 1:
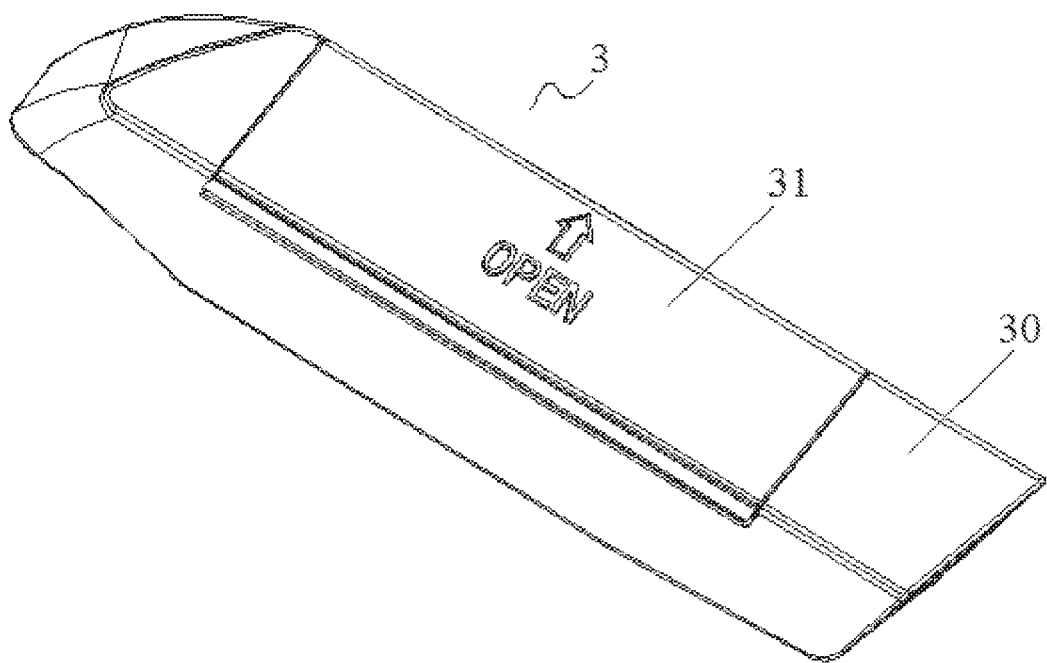
FIG. 1 is a schematic view of a wiper connection structure in a closed state in accordance with this disclosure.

1: Wiper; 10: Front step portion; 11: Rear step portion; 2: Wiper blade; 3: Wiper connection structure; 30: Connection body; 300: Containing chamber; 301: Upper opening; 302: entrance; 303: snap column; 304: First limit step; 305: First limit step; 306: Anti-warping slot; 307: Semicircular snap hole; 31: Upper cover; 310: Hook; 311: Limit bump.

DETAILED DESCRIPTION

The following are specific examples of how this disclosure is implemented so that persons having ordinary skill in the related art can easily understand the other advantages and benefits of this disclosure as disclosed in this specification. It is noteworthy that the structure, proportions, size, etc., of the drawings attached to this specification are intended to be used only in conjunction with the contents of this specification for the benefit of those having ordinary skill in the art and are not intended to limit the conditions under which this disclosure may be implemented. Any modification of structure, change in proportion or adjustment in size, without affecting the effect and purpose of this disclosure, shall remain within the scope of the technical content disclosed in this disclosure. The terms "first", "second", etc. in this disclosure are for provided for the convenience of illustration only, but not intended to limit the scope of this disclosure, and any change or adjustment in the relative relationship thereto, without materially changing the technical content, shall be deemed to be implemented by this disclosure. The changes or adjustments to the relative relationship, in the absence of a material change in technical content, shall also be deemed to be within the scope of this disclosure.

EMBODIMENT

Refer to FIGS. 1 to 4, and 7 for the schematic views of a wiper connection structure in a closed state and in an opened state, the schematic view and partially enlarged view of the wiper connection structure installed to a wiper blade, and the schematic view of the wiper connection structure assembled with the wiper and the wiper blade together in accordance with an embodiment of this disclosure respectively.

In this disclosure the wiper connection structure is used to connect a wiper 1 and a wiper blade 2 together. The wiper connection structure includes a connection body 30 and an upper cover 31, the connection body 30 is installed to the wiper blade 2, the connection body 30 is formed with a containing chamber 300, and the containing chamber 300 is opened at an upper surface and a lateral surface of the connection body 30 to respectively form an upper opening 301 and an entrance 302 provided for inserting a head portion of the wiper 1 into the containing chamber 300. The upper cover 31 is hinged to the upper opening 301 and capable of sealing/closing and opening the upper opening 301. In addition, at least one of the containing chamber 300 and the upper cover 31 is provided with a limiting part capable of stopping and limiting the head portion of the wiper 1 to ensure that the head portion of the wiper 1 may not fall of from the containing chamber 300.

In some embodiments, a side of the upper cover 31 and a side of the upper opening 301 are hinged with each other and the upper cover 31 and the upper opening 301 are integrally formed by plastic injection molding. In other words, the upper cover 31 and the connection body 30 are integrally formed by plastic injection molding, and a side of the upper cover 31 hinged to the upper opening 301 adopts a foldable joint design, and the other side of the upper cover 31 is detachably positioned and connected to the other side of the upper opening 301.

Figure 2:
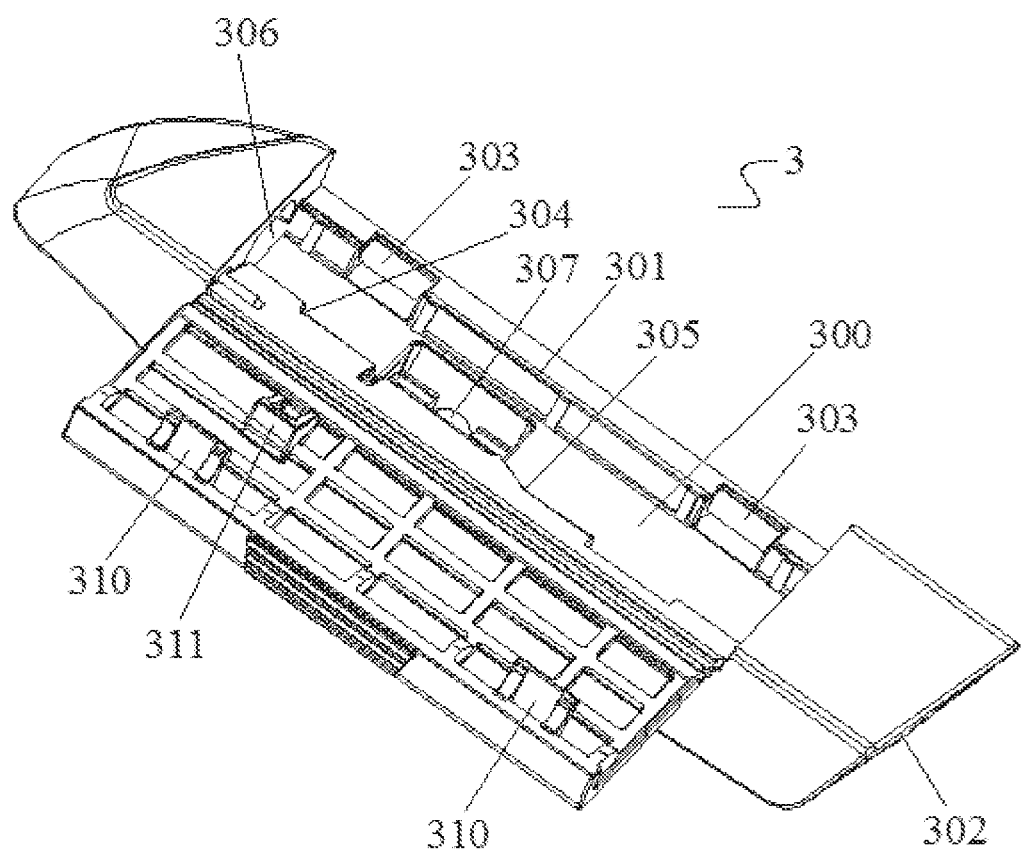
FIG. 2 is a schematic view of a wiper connection structure in an opened state in accordance with this disclosure.
Figure 3:
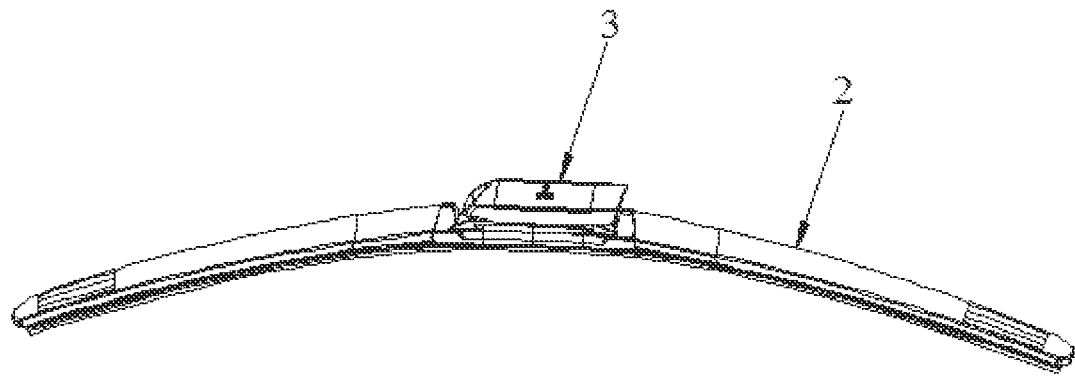
FIG. 3 is a schematic view showing the assembly structure of a wiper connection structure installed onto a wiper blade in accordance with this disclosure.
Figure 4:
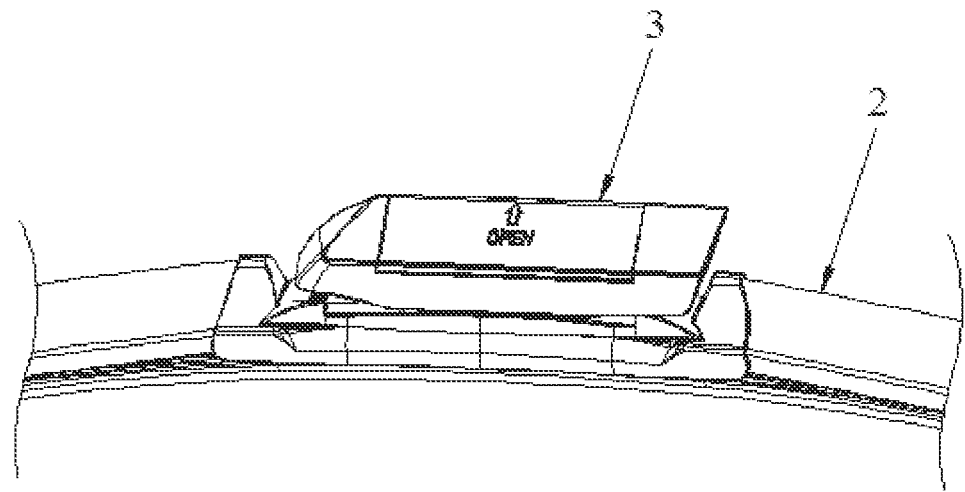
FIG. 4 is a partially enlarged view of FIG. 3.

In some embodiments, the other side of the upper cover 31 and the other side of the upper opening 301 are snapped and connected to each other. In FIG. 2, the upper cover 31 generally seals/closes the upper opening 301, which is a standard status. An inner wall on the other side of the upper cover 31 is integrally formed with a hook 310, and the other side of the upper opening 301 is integrally formed a snap column 303 which is snapped and connected to the hook 310.

In some embodiments, there are two hooks 310, and the hooks 310 are in an arc shape. There are two snap columns 303 and the two snap columns 303 are cylindrical structures. Of course, the positions of the hook 310 and the snap column 303 may be switched according to the design requirements, that is, the hook 310 is formed on the other side of the upper opening 301, and the snap column 303 is formed on the inner wall of the other side of the upper cover 31. It is noteworthy that the way of detachably positioning and connecting the other side of the upper cover 31 and the other side of the upper opening 301 may be magnetic connection, screw locking connection, etc., in addition to the above-mentioned snap connection, and these methods also fall within the scope of this disclosure.

In some embodiments, the containing chamber 300 and the upper cover 31 are provided with a limiting part for stopping and limiting the head portion of the wiper 1.

Figure 5:
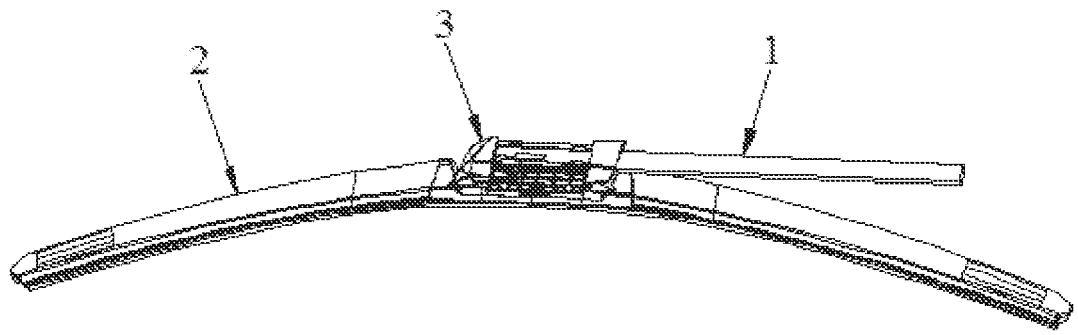
FIG. 5 is a schematic view of a wiper connection structure in an opened state and a wiper is plugged into the wiper connection structure in accordance with this disclosure.

In some embodiments, as shown in FIG. 5, the head portion of the wiper 1 is plugged from the entrance 302 into the containing chamber 300 along the front-rear direction. Correspondingly, a side of the upper cover 31 and a left side of the upper opening 301 are hinged with each other and integrally formed by plastic injection molding, and the other side of the upper cover 31 is detachably positioned and connected to the right side of the upper opening 301.

Figure 6:
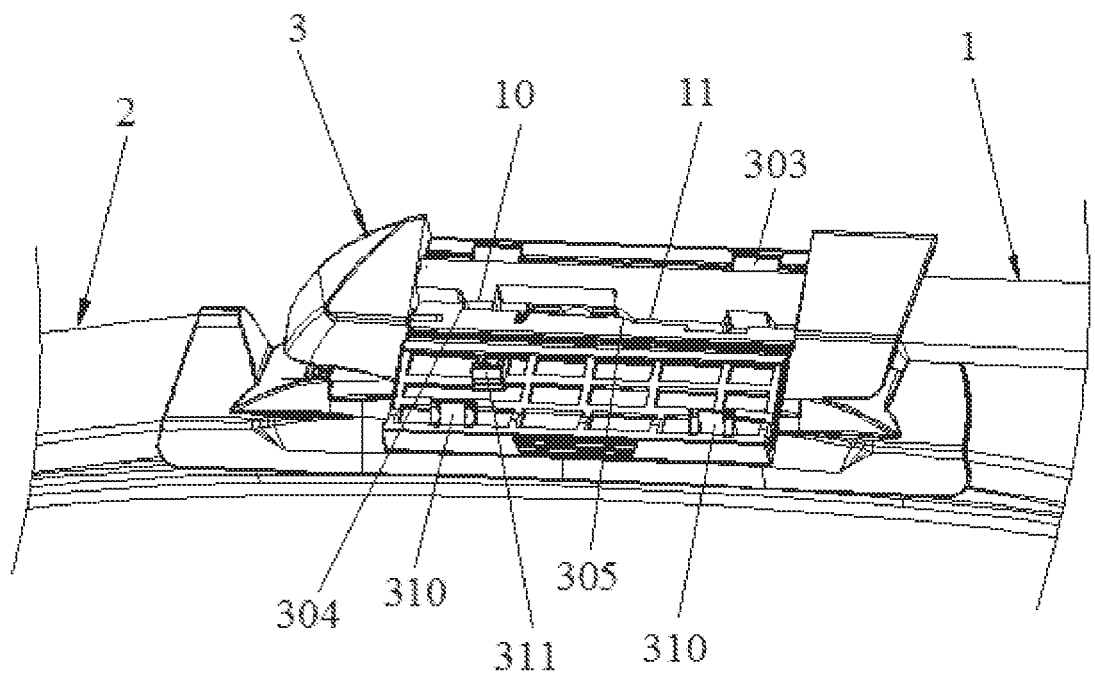
FIG. 6 is a partially enlarged view of FIG. 5.
Figure 7:
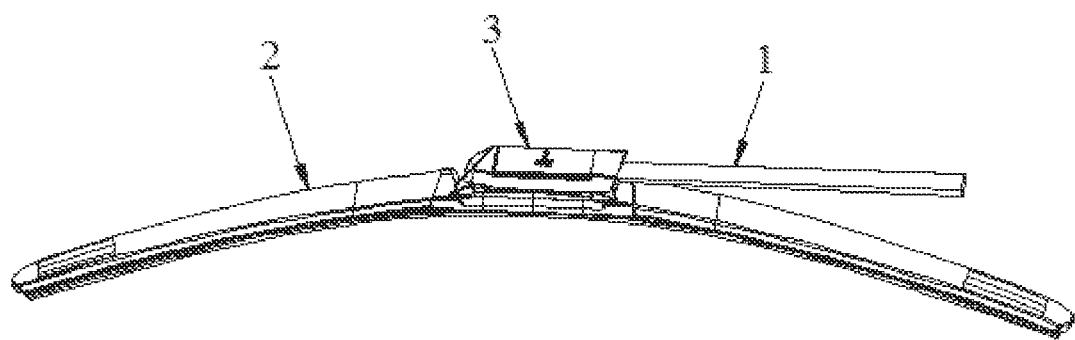
FIG. 7 is a schematic view of a wiper connection structure partially covering a wiper and fixing the wiper in accordance with this disclosure.

In FIG. 6, the head portion of the wiper 1 is formed with a front step portion 10 and a rear step portion 11 along the front-rear direction, and the front step portion 10 and the rear step portion 11 are spaced from each other. Each containing chamber 300 is integrally formed with a first limit step 304 on an inner sidewall proximate to the upper cover 31 (which is the left inner sidewall of the containing chamber 300) in a shape matched with the front step portion 10 and capable of stopping and limiting the front side of the front step portion 10, and a second limit step 305 on the inner sidewall proximate to the upper cover 31 (which is the left inner sidewall of the containing chamber 300) in a shape matched with the rear step portion 11 and capable of stopping and limiting the front side of the rear step portion 11. The inner wall of the upper cover 31 is integrally formed a limit bump 311 capable of stopping and limiting the rear side of the front step portion 10 when the upper cover 31 seals/closes the upper opening 301. Correspondingly, a dodge slot is formed on the wiper 1 and between the front step portion 10 and the rear step portion 11 for accommodating the limit bump 311.

The limiting part includes the first limit step 304, the second limit step 305 and the limit bump 311, but the three parts have different functions. The first limit step 304 and the second limit step 305 are mainly used to prevent the head portion of the wiper 1 from moving too far forward, such that the head portion of the wiper 1 may move quickly and accurately into place, and to facilitate the upper cover 31 to fasten, and the limit bump 311 is mainly provided for preventing the wiper from falling out of the containing chamber. In short, the above three parts work together to ensure that the head portion of the wiper 1 may not fall out of the containing chamber 300.

In some embodiments as shown in FIG. 2, an anti-warping slot 306 is formed on an inner sidewall of the containing chamber 300 opposite to the entrance 302 (which is the front inner sidewall of the containing chamber 300) and communicating to the containing chamber 300, and the front side of the head portion of the wiper 1 is freely pluggable into the anti-warping slot 306. By the anti-warping slot 306, the head portion of the wiper 1 is prevented from warping to facilitate the snapping of the upper cover 31.

In some embodiments, a round shaft is fixed to the wiper blade 2, the connection body 30 is provided with a semicircular snap hole 307 (as shown in FIG. 2), and the connection body 30 tightly sheathes the round shaft through the semicircular snap hole 307. Of course, the connection body 30 may rotate relative to the wiper blade 2 when an external force is applied.

In summation of the description above, the wiper connection structure of this disclosure, compared to the related art, has the function of easy assembly and disassembly, and high tightness of assembly, which greatly improves the installation efficiency and safety of the wiper assembly. In addition, the wiper connection structure can also play a good role in covering and protecting the joint of the wiper and wiper blade, which effectively extends the service life of the windshield wiper.

While this disclosure has been described by means of specific embodiments, numerous modifications and variations could be made thereto by those skilled in the art without departing from the scope and spirit of this disclosure set forth in the claims.

What is claimed is:

1. A wiper connection structure, for coupling a wiper and a wiper blade together, characterized in that the wiper connection structure comprises a connection body and an upper cover, wherein the connection body is used for connecting with the wiper blade, the connection body comprises a containing chamber defined thereon, the containing chamber is opened at an upper surface and a lateral surface of the connection body to define an upper opening and an entrance for inserting a head portion of the wiper to the containing chamber; the upper cover is hinged to the upper opening, the upper cover is configured to close and open the upper opening; at least one of the containing chamber and the upper cover comprises a limiting part stopping and limiting the head portion of the wiper to make the head portion of the wiper be free from falling off from the containing chamber,
wherein the containing chamber and the upper cover are respectively provided with the limiting part for stopping and limiting the head portion of the wiper;
wherein the head portion of the wiper is inserted from the entrance into the containing chamber along a front-rear direction;
the head portion of the wiper comprises a front step portion and a rear step portion arranged at intervals along the front-rear direction;
the containing chamber comprises a first limit step integrally formed on an inner sidewall thereof adjacent to the upper cover and matched with the front step portion in shape to stop and limit a front side of the front step portion, a second step integrally formed on the inner sidewall thereof adjacent to the upper cover and matched with the rear step portion in shape to and limit a front side of portion; and
the upper cover comprises a limit bump integrally formed on an inner wall thereof and configured to stop and limit a rear side of the front step portion when the upper cover closes the upper opening.

2. The wiper connection structure according to claim 1, characterized in that a side of the upper cover is hinged to a side of the upper opening, and the upper cover and the upper opening are integrally formed by plastic injection molding, and another side of the upper cover is detachably positioned and coupled to another side of the upper opening.

3. The wiper connection structure according to claim 2, characterized in that the another side of the upper cover and the another side of the upper opening are snapped and coupled to each other.

4. The wiper connection structure according to claim 3, characterized in that, based on a state that the upper cover closes the upper opening, an inner wall of the another side of the upper cover is integrally formed with a hook, and the another side of the upper opening is integrally formed with a snap column snapped with the hook.

5. The wiper connection structure according to claim 1, characterized in that an anti-warping slot is defined on an inner side wall of the containing chamber opposite to the entrance and communicates to the containing chamber, and a front side of the head portion of the wiper is freely inserted into the anti-warping slot.

6. The wiper connection structure according to claim 1, characterized in that the wiper blade comprises a round shaft fixed thereon, the connection body comprises a semicircular snap hole, and the connection body sheathes the round shaft through the semicircular snap hole.

* * * * *